US006772919B2

(12) United States Patent
Magri

(10) Patent No.: US 6,772,919 B2
(45) Date of Patent: Aug. 10, 2004

(54) DEVICE FOR DISPENSING FLUID FOODSTUFFS, PARTICULARLY FOR AUTOMATIC OR SEMIAUTOMATIC HOT OR COLD BEVERAGE VENDING MACHINES

(75) Inventor: Curzio Aldo Magri, Bergamo (IT)

(73) Assignee: I.V.L. Innovative Valve Lab S.r.l., Bergamo (IT)

( * ) Notice: Subject to any disclaimer, the term of this patent is extended or adjusted under 35 U.S.C. 154(b) by 0 days.

(21) Appl. No.: 09/810,391

(22) Filed: Mar. 19, 2001

(65) Prior Publication Data

US 2001/0023881 A1 Sep. 27, 2001

(30) Foreign Application Priority Data

Mar. 24, 2000 (IT) .................................... MI2000A0634

(51) Int. Cl.[7] ............................ F16K 31/02; B67D 3/00
(52) U.S. Cl. ................ 222/504; 251/129.17; 251/129.2
(58) Field of Search ....................... 222/504; 251/129.2, 251/129.17

(56) References Cited

U.S. PATENT DOCUMENTS 4,285,497 A * 8/1981 Gottel .................. 137/625.44
5,799,696 A * 9/1998 Weiss .................... 137/625.44

* cited by examiner

*Primary Examiner*—Kevin Shaver
*Assistant Examiner*—Stephanie Willatt
(74) *Attorney, Agent, or Firm*—Guido Modiano; Albert Josif; Daniel O'Byrne

(57) ABSTRACT

A device for dispensing fluid foodstuffs, particularly for automatic or semiautomatic hot or cold beverage vending machines, comprising a hollow body inside which there is a chamber connected to an intake which is connected to a duct for introducing a fluid to be dispensed and to an outlet which is connected to a fluid dispensing duct. A flow control element connected to actuation means is arranged in the chamber and can move on command, through the action of the actuation means, in order to interrupt the connection between the intake and the outlet. The flow control element is arranged proximate to the intake and can move on command in order to open or close the intake.

5 Claims, 2 Drawing Sheets

DEVICE FOR DISPENSING FLUID FOODSTUFFS, PARTICULARLY FOR AUTOMATIC OR SEMIAUTOMATIC HOT OR COLD BEVERAGE VENDING MACHINES

BACKGROUND OF THE INVENTION

The present invention relates to a device for dispensing fluid foodstuffs, particularly for automatic or semiautomatic hot or cold beverage vending machines.

In automatic or semiautomatic hot or cold beverage vending machines, the beverage is dispensed by means of a dispensing device constituted by an electric valve which constitutes the element for controlling the flow of the dispensed liquid.

Electric valves currently used for this application are generally constituted by a hollow body inside which there is a dispensing chamber connected to an intake which is connected to a duct for introducing the fluid to be dispensed and to an outlet which is connected to a duct for dispensing the fluid.

The intake generally has a horizontal axis, while the outlet generally has a vertical axis and is arranged at a lower level than the intake. Inside the dispensing chamber there is a flow control element which is actuated by means of an electromagnet and can move on command in order to open or close the outlet.

Substantially, in these conventional devices the dispensing chamber is constantly connected to the duct for introducing the fluid to be dispensed and is therefore occupied by the fluid to be dispensed even when the dispensing of said fluid is not required.

In these devices, the amount of dispensed fluid is controlled by imposing a preset time on the activation of the electromagnet that actuates the flow control element, and it is therefore fundamentally important, in order to achieve sufficiently precise dispensing, that the response times of the flow control element, upon activation of the electromagnet that actuates it, be as constant as possible over time.

These devices have some drawbacks.

Due to the fact that the flow control element acts on the outlet, during the opening of the outlet a more or less laminar, and therefore a more or less ordered, flow of fluid can be triggered randomly through the outlet and can lead to alterations of the flow of the dispensed fluid and therefore to variations in the amount of dispensed fluid for an equal opening time of the outlet.

Moreover, due to the fact that the dispensing chamber is constantly occupied by the fluid, scale deposits can occur on the walls of the dispensing chamber and particularly adjacent to the flow control element. These scale deposits can alter the response times of the flow control element to the activation of the electromagnet and can also therefore lead to changes in the amount of dispensed fluid.

The formation of scale deposits can also cause the migration of scale particles which can become interposed between the flow control element and the outlet, altering the seal and therefore causing leakage when the flow control element is moved into the closure position.

Again due to the constant presence of fluid inside the dispensing chamber, in conventional devices fluid can pass from the dispensing chamber into the container that contains the electromagnet. This seepage can damage the electromagnet, altering its operation and therefore compromising the functionality of the device.

SUMMARY OF THE INVENTION

The aim of the present invention is to solve the above-described problems, by providing a device for dispensing fluid foodstuffs, particularly for automatic or semiautomatic hot or cold beverage vending machines, which is capable of ensuring constancy and high precision of the amount of dispensed liquid which do not change over time.

Within this aim, an object of the invention is to provide a device which avoids or substantially reduces the possibility of formation of scale deposits in the region affected by the flow control element used to perform or interrupt the dispensing of the fluid.

Another object of the invention is to provide a device in which the response times of the flow control element, in performing or interrupting the dispensing of the fluid, are substantially invariant over time.

Another object of the invention is to provide a device which is highly reliable in operation and can be manufactured at competitive costs.

This aim and these and other objects which will become better apparent hereinafter are achieved by a device for dispensing fluid foodstuffs, particularly for automatic or semiautomatic hot or cold beverage vending machines, comprising a hollow body inside which there is a chamber connected to an intake which is connected to a fluid inlet duct and to an outlet which is connected to a fluid dispensing duct, a movable element, a flow control element forming a single piece with said movable element and connected to actuation means arranged in said chamber, said flow control element being movable on command, through the action of said actuation means on said movable element, in order to interrupt the connection between said intake and said outlet, characterized in that said flow control element is arranged proximate to said intake and can move on command in order to open or close said intake.

BRIEF DESCRIPTION OF THE DRAWINGS

Further characteristics and advantages of the invention will become better apparent from the following detailed description of a preferred but not exclusive embodiment of the device according to the invention, illustrated only by way of non-limitative example in the accompanying drawings, wherein.

DESCRIPTION OF THE PREFERRED EMBODIMENTS

Figure 1:
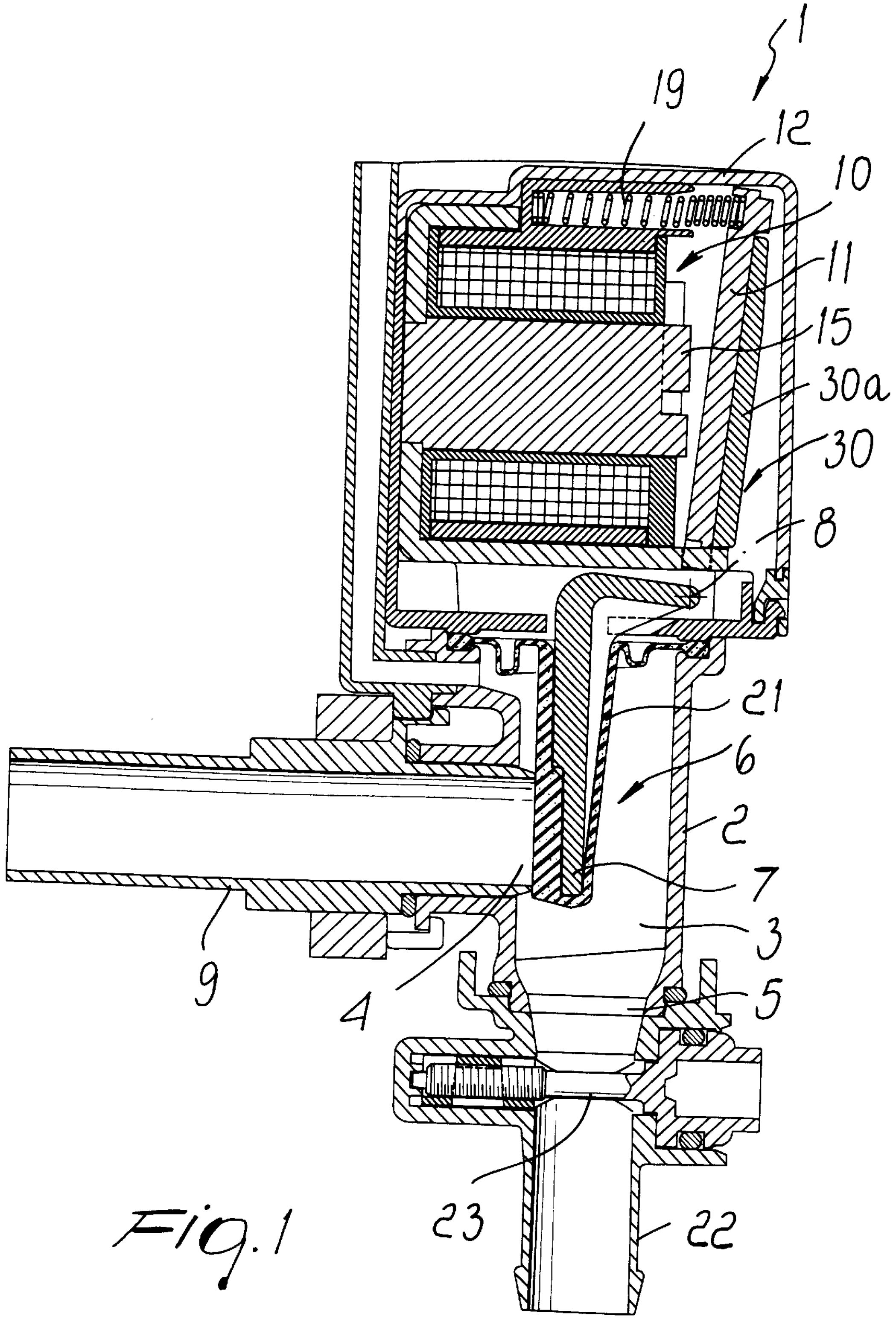
FIG. 1 is a schematic sectional view of the device according to the invention, taken along a vertical plane, with the flow control element in the closed position.
Figure 2:
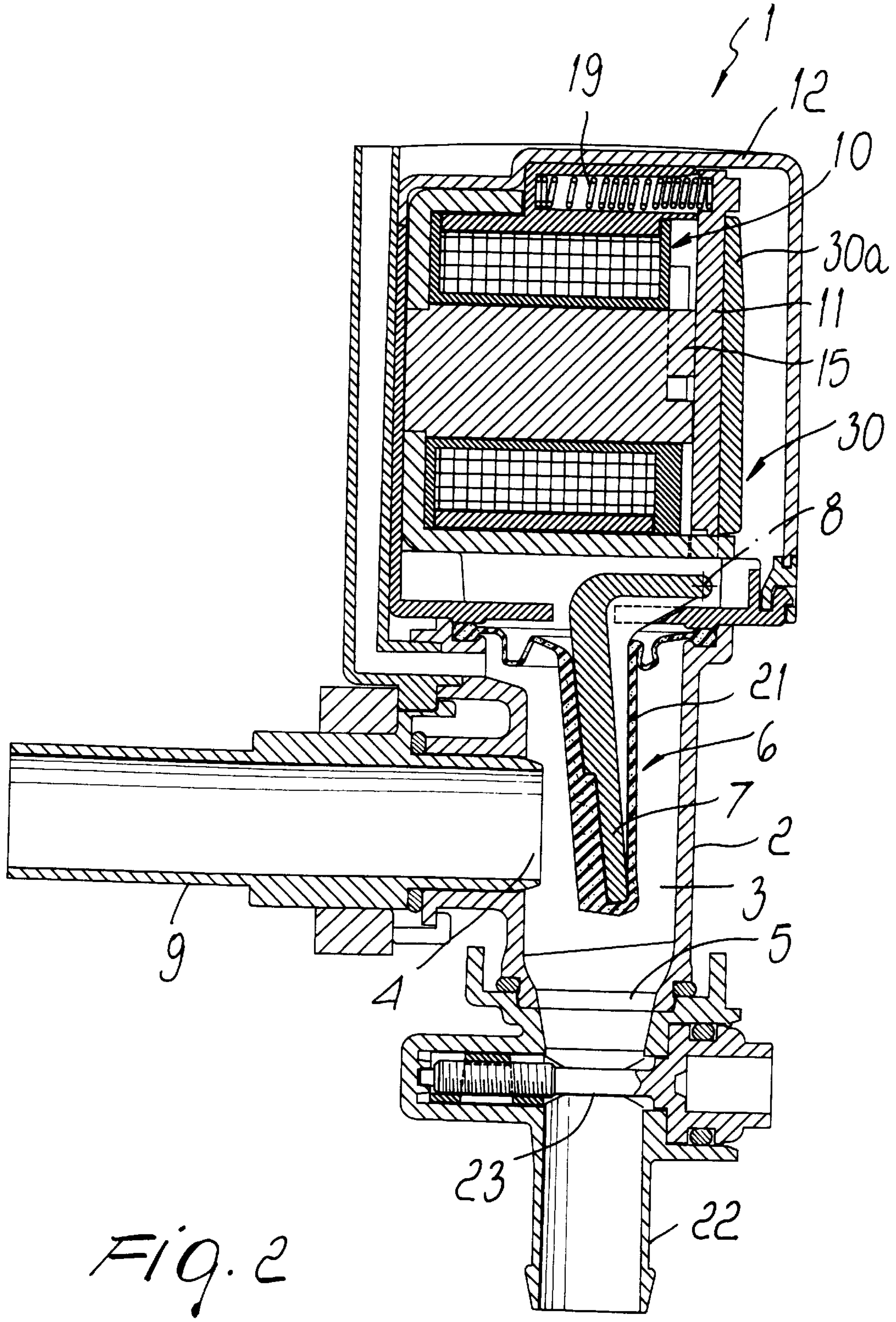
FIG. 2 is a view, similar to FIG. 1, of the device with the flow control element in the open position.

With reference to the figures, the device according to the invention, generally designated by the reference numeral 1, comprises a hollow body 2 in which there is a chamber 3 which is connected to an intake 4 and to an outlet 5.

Preferably, the chamber 3 has a substantially cylindrical shape with a vertical axis, with possible variations in diameter along its axial extension, and the intake 4 is arranged at a higher level than the outlet 5.

Conveniently, the intake 4 has a substantially horizontal axis, while the outlet 5 has a substantially vertical axis.

Inside the chamber 3 there is a flow control element 6 which is connected to actuation means, preferably of the electromagnetic type. The flow control element 6 can move on command, through the action of the actuation means, in order to interrupt the connection between the intake 4 and the outlet 5.

According to the invention, the flow control element 6 is arranged proximate to the intake 4 and can move on command in order to open or close the intake 4.

Preferably, the flow control element 6 is constituted by a flap 7 pivoted about a pivoting axis 8 which is substantially perpendicular to the axis of the intake 4. The flap 7 can rotate on command about the pivoting axis 8 through the action of the actuation means in order to open or close the intake 4.

The flap 7 constitutes an arm of a first lever 30 which is pivoted, with an intermediate portion, about the pivoting axis 8.

The intake 4 is formed by the end of a tubular body 9 which constitutes the fluid inlet duct and protrudes into the chamber 3. The flap 7, in the position for closing the intake 4, engages against said end of the tubular body 9.

The actuation means are preferably constituted by an electromagnet 10 which acts on command on a movable element 11 which can be attracted magnetically and is connected to the flap 7 in order to produce its rotation about the pivoting axis 8, as will become better apparent hereinafter.

The electromagnet 10 is preferably arranged inside an enclosure 12 which is fixed to the upper end of the hollow body 2.

The electromagnet 10 is arranged so that the axis of its core 15 is substantially horizontal and parallel to the axis of the intake 4.

The movable element 11 is fixed to an arm 30*a* of the lever 30, opposite with respect to the arm that constitutes the flap 7, and facing the core 15 of the electromagnet 10.

Between the arm 30*a* of the lever 30, facing the core of the electromagnet 10 and the enclosure 12, a spring 19 is interposed. Also the spring 19 is inside the enclosure 12 and elastically contrasts the rotation of the lever 30 about axis 8 in the direction of rotation that disengages the flap 7 from the intake 4.

The flap 7 is conveniently covered with a membrane 21 which constitutes the sealing element in the closure of the flap 7 against the intake 4. The membrane 21 covers the flap 7 substantially completely and has a portion which is interposed between the enclosure 12 and the hollow body 3, so as to isolate with a fluid-tight seal the inside of the enclosure 12 from the chamber 3.

The body 2 has, below the outlet 5, an extension 22 which constitutes the dispensing duct. A plug 23 can be provided along the dispensing duct 22 and can be operated manually in order to close the dispensing duct 22 when the device does not need to be used.

Operation of the device according to the invention is as follows.

When the electromagnet 10 is not energized, the action of the spring 19 on the first lever 30 keeps the flap 7 against the intake 4. In this manner, dispensing of the fluid through the dispensing duct 22 is prevented.

It should be noted that in these conditions the chamber 3, differently from the dispensing chambers of conventional devices, is empty, and therefore the possibility of formation of scale deposits on the walls of the chamber 3 is effectively avoided.

When the electromagnet 10 is energized, it attracts the arm 30*a* of the lever 30, which faces the core 15 of the electromagnet 10, causing the rotation of the lever 30 about the pivoting axis 8 in contrast with the action of the spring 19. Due to this rotation, the flap 7 moves away from the dispensing intake 4, opening it and therefore allowing the fluid to flow from the intake duct 9 toward the dispensing duct 22.

It should be noted that the fluid, as it enters the chamber 3, strikes the flap 7, or rather the membrane 21 that covers it, performing a sort of cleaning of said membrane and therefore assuredly preventing the retention of any solid particles on the surface of the membrane 21 that is directed toward the intake 4.

When the electromagnet 10 is de-energized, the spring 19 returns the flap 7 into the closure position, moving the arm 30*a*, which faces the core 15 of the electromagnet 10, away from the same core 15 of the electromagnet 10, interrupting the dispensing of the fluid.

In practice it has been observed that the device according to the invention fully achieves the intended aim and objects, since by actuating the interruption of the dispensing of the fluid by means of the closure of the port that is connected to the duct for introducing the fluid in the device it effectively avoids the onset of defects in the actuation of the flow control element, maintaining the amount of dispensed fluid constant and repeatable over time.

Another advantage, which arises from the cleaning of the flow control element performed by the flow of the dispensed liquid itself and from the prevention of the formation of scale deposits, is that the number of maintenance interventions required to keep the device efficient is reduced.

The device thus conceived is susceptible of numerous modifications and variations, all of which are within the scope of the inventive concept; all the details may further be replaced with other technically equivalent elements.

In practice, the materials employed, so long as they are compatible with the specific use, as well as the dimensions, may be any according to requirements and to the state of the art.

The disclosures in Italian Patent Application No. M12000A000264 from which this application claims priority are incorporated herein by reference.

What is claimed is:

1. A device for dispensing fluid foodstuffs, particularly for automatic or semiautomatic hot or cold beverage vending machines, comprising a hollow body inside which there is a chamber connected to an intake which is connected to a fluid inlet duct and to an outlet which is connected to a fluid dispensing duct, a movable element, a flow control element forming a single piece with said movable element and connected to actuation means arranged in said chamber, said flow control element being movable on command, through the action of said actuation means on said movable element in order to interrupt the connection between said intake and said outlet, wherein said flow control element is arranged proximate to said intake and can move on command in order to open or close said intake, said flow control element comprising a flap which is pivoted about a pivoting axis which is substantially perpendicular to the axis of said intake; said flap being rotatable on command about said pivoting axis, through the action of said actuation means on said movable element in order to open or close said intake, said actuation means comprising an electromagnet which acts on command on said movable element which can be attracted magnetically and is connected to said flap for its rotation about said pivoting axis, and wherein said electromagnet is arranged inside an enclosure that is connected to said hollow body above said chamber, said flap being covered by a membrane which is interposed, with one of its portions, between said enclosure and said hollow body in order to isolate, with a fluid-tight seal, the inside of said enclosure from said chamber.

2. The device according to claim 1, wherein said intake is formed by the end of a tubular body which protrudes into said chamber, said flap, in the position for closing said intake, engaging said end of the tubular body.

3. The device according to claim 1, wherein said chamber is shaped substantially like a cylinder with a vertical axis, said intake being orientated so that an axis thereof is substantially horizontal and said outlet being orientated so that an axis thereof is substantially vertical, said intake being arranged at a higher level than said outlet.

4. The device according to claim 1, wherein said flap constitutes the arm of a lever which is pivoted, with an intermediate portion of its extension, about said pivoting axis, said movable element being fixed to an opposite arm of said lever that faces a core of said electromagnet to form a single piece with said flow control element.

5. The device according to claim 4, wherein said lever is rotatable about said pivoting axis, in a direction that opens said intake in contrast with elastic return means.

* * * * *